(12) United States Patent
Hauswiesner et al.

(10) Patent No.: US 10,380,794 B2
(45) Date of Patent: Aug. 13, 2019

(54) METHOD AND SYSTEM FOR GENERATING GARMENT MODEL DATA

(71) Applicant: Reactive Reality GmbH, Graz (AT)

(72) Inventors: Stefan Hauswiesner, Puch Bei Weiz (AT); Philipp Grasmug, Graz (AT)

(73) Assignee: REACTIVE REALITY GMBH, Graz (AT)

( * ) Notice: Subject to any disclaimer, the term of this patent is extended or adjusted under 35 U.S.C. 154(b) by 141 days.

(21) Appl. No.: 15/535,942

(22) PCT Filed: Dec. 14, 2015

(86) PCT No.: PCT/EP2015/079633
§ 371 (c)(1),
(2) Date: Jun. 14, 2017

(87) PCT Pub. No.: WO2016/102228
PCT Pub. Date: Jun. 30, 2016

(65) Prior Publication Data
US 2017/0372515 A1 Dec. 28, 2017

(30) Foreign Application Priority Data
Dec. 22, 2014 (EP) .................................. 14199802

(51) Int. Cl.
*G06K 9/00* (2006.01)
*G06T 17/10* (2006.01)
(Continued)

(52) U.S. Cl.
CPC .............. *G06T 17/10* (2013.01); *G06T 7/11* (2017.01); *G06T 7/12* (2017.01); *G06T 7/149* (2017.01);
(Continued)

(58) Field of Classification Search
None
See application file for complete search history.

(56) References Cited

U.S. PATENT DOCUMENTS

| 4,539,585 A | 11/1985 | Spackova |
| 4,621,012 A | 11/1986 | Pusch |

(Continued)

FOREIGN PATENT DOCUMENTS

| CN | 101736921 B | 6/2011 |
| DE | 202007008176 U1 | 8/2007 |

(Continued)

OTHER PUBLICATIONS

Hauswiesner, S.: "Efficient Image-Based Augmentations" Dissertation, Graz University of Technology, Graz, Jan. 2013, pp. 1-14.
(Continued)

*Primary Examiner* — Atiba O Fitzpatrick
(74) *Attorney, Agent, or Firm* — Eschweiler & Potashnik, LLC

(57) ABSTRACT

In a process for generating garment model data representative of a piece of garment, input image data containing a view of the piece of garment are processed. A type of wearing condition is determined as at least one of a first type of worn garment and of a second type of not-worn garment. If the first type is determined, a shape of the piece of garment and a shape of the person wearing the garment are identified utilizing an active contour modelling approach based on a preset body model. The identified shapes are adapted based on a garment template model. The garment model data are determined from the input image data based on the adapted identified shapes. If the second type is determined, a shape of the piece of garment is identified. The input image data are iteratively compared with a respective garment template model to identify at least one matching garment template model. The identified shape is aligned with a shape of the at
(Continued)

least one matching garment template model and the garment model data are determined from the input image data based on the identified shape and on results of the aligning.

18 Claims, 5 Drawing Sheets

(51) Int. Cl.
  *G06T 17/00* (2006.01)
  *G06T 7/12* (2017.01)
  *G06T 7/149* (2017.01)
  *G06T 7/11* (2017.01)
  *G06T 7/33* (2017.01)
  *G06T 7/143* (2017.01)

(52) U.S. Cl.
  CPC .............. *G06T 7/344* (2017.01); *G06T 17/00* (2013.01); *G06T 7/143* (2017.01); *G06T 2207/20116* (2013.01); *G06T 2207/30196* (2013.01); *G06T 2210/16* (2013.01)

(56) References Cited

U.S. PATENT DOCUMENTS

| | | | |
|---|---|---|---|
| 5,515,268 A | 5/1996 | Yoda | |
| 5,530,652 A | 6/1996 | Croyle | |
| 5,680,528 A | 10/1997 | Korszun | |
| 5,724,522 A | 4/1998 | Kagami | |
| 5,825,828 A | 10/1998 | Sasaki | |
| 5,850,222 A | 12/1998 | Cone | |
| 5,930,769 A | 7/1999 | Rose | |
| 5,937,081 A | 8/1999 | O'Brill | |
| 6,144,388 A | 11/2000 | Bornstein | |
| 6,307,568 B1 | 10/2001 | Rom | |
| 6,415,199 B1 | 7/2002 | Liebermann | |
| 6,546,309 B1 | 4/2003 | Gazzuolo | |
| 6,624,843 B2 | 11/2003 | Lennon | |
| 6,629,014 B1 | 11/2003 | Lam | |
| 6,661,433 B1 | 12/2003 | Lee | |
| 6,665,577 B2 | 12/2003 | Onyshkevyvh | |
| 6,711,455 B1 | 3/2004 | Holloway | |
| 6,810,300 B1 | 10/2004 | Woltman | |
| 6,901,379 B1 | 5/2005 | Balter | |
| 6,903,756 B1 | 6/2005 | Giannini | |
| 6,907,310 B2 | 6/2005 | Gardner | |
| 6,965,873 B1 | 11/2005 | Rhoads | |
| 6,968,075 B1 | 11/2005 | Chang | |
| 7,020,538 B2 | 4/2006 | Luhnow | |
| 7,039,486 B2 | 5/2006 | Wang | |
| 7,062,454 B1 | 6/2006 | Giannini | |
| 7,133,839 B2 | 11/2006 | Inoue | |
| 7,149,665 B2 | 12/2006 | Feld | |
| 7,194,327 B2 | 3/2007 | Lam | |
| 7,194,428 B2 | 3/2007 | Wan | |
| 7,212,202 B2 | 5/2007 | Weaver | |
| 7,308,332 B2 | 12/2007 | Okada | |
| 7,328,177 B1 | 2/2008 | Lin-Hendel | |
| 7,356,489 B2 | 4/2008 | Illsley | |
| 7,386,429 B1 | 6/2008 | Fujisaki | |
| 7,398,133 B2 | 7/2008 | Wannier | |
| 7,421,306 B2 | 9/2008 | Adiseshan | |
| 7,479,956 B2 | 1/2009 | Shaw-Weeks | |
| 7,487,116 B2 | 2/2009 | Paolini | |
| 7,617,016 B2 | 11/2009 | Wannier | |
| 7,826,997 B2 | 11/2010 | Wang | |
| 7,917,397 B1 | 3/2011 | Giannini | |
| 8,036,416 B2 | 10/2011 | Matsumoto | |
| 8,090,465 B2 | 1/2012 | Zeng | |
| 8,095,426 B2 | 1/2012 | Adelman | |
| 8,174,521 B2 | 5/2012 | Harvill | |
| 8,229,799 B2 | 7/2012 | Singhal | |
| 8,275,590 B2 | 9/2012 | Szymczyk | |
| 8,321,301 B2 | 11/2012 | Manea | |
| 8,364,561 B2 | 1/2013 | Wolper | |
| 8,370,360 B2 | 2/2013 | Mo | |
| 8,380,586 B2 | 2/2013 | Paolini | |
| 8,386,486 B2 | 2/2013 | Zhang | |
| 8,390,648 B2 | 4/2013 | Ptucha | |
| 8,437,871 B2 | 5/2013 | Ko | |
| 8,438,081 B2 | 5/2013 | Gray | |
| 8,478,663 B2 | 7/2013 | Lu | |
| 8,548,862 B2 | 10/2013 | Giannini | |
| 8,605,148 B2 | 12/2013 | Robertson | |
| 8,606,645 B1 | 12/2013 | Applefeld | |
| 8,655,053 B1* | 2/2014 | Hansen | G06Q 10/10 382/154 |
| 8,660,902 B2 | 2/2014 | Coulter | |
| 8,674,989 B1 | 3/2014 | Dalal | |
| 8,682,738 B2 | 3/2014 | Ivanov | |
| 8,682,749 B1 | 3/2014 | Giannini | |
| 8,700,477 B2 | 4/2014 | Wolper | |
| 8,768,786 B2 | 7/2014 | Paolini | |
| 8,803,914 B2 | 8/2014 | Chen | |
| 2001/0042029 A1 | 11/2001 | Galvez | |
| 2002/0024517 A1 | 2/2002 | Yamaguchi | |
| 2002/0188372 A1 | 12/2002 | Lane | |
| 2003/0050864 A1 | 3/2003 | Trajkovic | |
| 2003/0101105 A1 | 5/2003 | Vock | |
| 2003/0110099 A1 | 6/2003 | Trajkovic | |
| 2004/0039592 A1 | 2/2004 | Shima | |
| 2004/0049309 A1 | 3/2004 | Gardner | |
| 2004/0227752 A1 | 11/2004 | McCartha | |
| 2005/0052461 A1 | 3/2005 | Vassilev | |
| 2005/0131776 A1 | 6/2005 | Perotti | |
| 2005/0234782 A1 | 10/2005 | Schackne | |
| 2006/0098865 A1 | 5/2006 | Yang | |
| 2006/0149638 A1 | 7/2006 | Allen | |
| 2008/0071559 A1 | 3/2008 | Arrasvuori | |
| 2008/0082395 A1 | 4/2008 | Shulman | |
| 2008/0163344 A1 | 6/2008 | Yang | |
| 2008/0163054 A1 | 7/2008 | Pieper | |
| 2008/0222262 A1 | 9/2008 | Oh | |
| 2008/0249897 A1 | 10/2008 | Oh | |
| 2009/0018926 A1 | 1/2009 | Buehlman | |
| 2009/0115777 A1 | 5/2009 | Reyers Moreno | |
| 2009/0116698 A1 | 5/2009 | Zhang | |
| 2009/0144173 A1 | 6/2009 | Mo | |
| 2009/0154796 A1 | 6/2009 | Gupta | |
| 2010/0049633 A1 | 2/2010 | Wannier | |
| 2010/0111370 A1 | 5/2010 | Black | |
| 2010/0191770 A1 | 7/2010 | Cho | |
| 2011/0078055 A1 | 3/2011 | Faribault | |
| 2011/0157218 A1 | 6/2011 | Ptucha | |
| 2011/0231278 A1 | 11/2011 | Fries | |
| 2011/0234581 A1 | 11/2011 | Eikelis | |
| 2011/0298897 A1 | 12/2011 | Sareen | |
| 2012/0127199 A1 | 5/2012 | Aarabi | |
| 2012/0192235 A1 | 7/2012 | Tapley | |
| 2012/0284148 A1 | 11/2012 | Volchek | |
| 2012/0287122 A1 | 11/2012 | Nadar | |
| 2012/0299912 A1 | 11/2012 | Kapur | |
| 2012/0310791 A1 | 12/2012 | Weerasinghe | |
| 2013/0050190 A1 | 2/2013 | Lee | |
| 2013/0054425 A1 | 2/2013 | Portelos | |
| 2013/0066750 A1 | 3/2013 | Siddique | |
| 2013/0083065 A1 | 4/2013 | Schulze | |
| 2013/0113829 A1 | 5/2013 | Suzuki | |
| 2013/0219434 A1 | 8/2013 | Farrell | |
| 2013/0249908 A1 | 11/2013 | Black | |
| 2014/0010449 A1 | 1/2014 | Haaramo | |
| 2014/0035913 A1* | 2/2014 | Higgins | G06T 17/00 345/420 |
| 2014/0040041 A1 | 2/2014 | Ohnemus | |
| 2014/0100997 A1 | 4/2014 | Mayerle | |
| 2014/0108208 A1 | 4/2014 | Piana | |
| 2014/0176565 A1 | 6/2014 | Adeyoola | |
| 2014/0244431 A1 | 8/2014 | Bright | |
| 2015/0058083 A1 | 2/2015 | Herrero | |
| 2016/0026926 A1 | 1/2016 | Yeung | |

(56) References Cited

U.S. PATENT DOCUMENTS

FOREIGN PATENT DOCUMENTS

| EP | 1719423 A1 | 8/2006 |
|---|---|---|
| EP | 2249269 A1 | 10/2010 |
| WO | 0146911 A1 | 6/2001 |
| WO | 0152140 A1 | 7/2001 |
| WO | 0173688 A2 | 10/2001 |
| WO | 0175750 A1 | 10/2001 |
| WO | 0139051 A9 | 11/2002 |
| WO | 2081144 A1 | 7/2009 |
| WO | 2010036947 A1 | 4/2010 |
| WO | 2014028714 A2 | 2/2014 |
| WO | 2014081394 A1 | 5/2014 |

OTHER PUBLICATIONS

Chen, Hong et al: "Composite Templates for Cloth Modeling and Sketching" Article, Departments of Statistics and Computer Science, University of California, Los Angeles.

Guan, Peng et al: "A 2D Human Body Model Dressed in Eigen Clothing", Department of Computer Science, Division of Applied Mathematics, Brown University, Providence, Rhode Island.

Kalantidis, Yannis et al: "Getting the Look: Clothing Recognition and Segmentation for Automatic Product Suggestions in Everyday Photos", Web Article, Apr. 16-20, 2013, Yahoo Research, National Technical University of Athens.

Anguelov, Dragomir et al: " Scape: Shape Completion and Animation of People", Sanford University and University of California, Santa Cruz.

Liu, Zhijiao et al: "GetDressed: A Personalized and Contextually-Aware Clothing Advisor for the Home", Article, Texas A&M University, College Station, Texas.

Le, Quang-Song et al: "Overlay Upper Clothing Textures to Still Images Based on Human Pose Estimation", Article, Journal of Mobile Multimedia, vol. 10, Issues 1 & 2, May 2014, pp. 43-57, Rinton Press.

Ye, Mao et al:" Real-Time Human Pose and Shape Estimation for Virtual Try-On Using a Single Commodity Depth Camera", Article, IEEE, Sep. 12, 2013.

Gultepe, Umut et al: "Real-Time Virtual Fitting With Body Measurement and Motion Smoothing", Article, Computers and Graphics, vol. 43, Oct. 2014, pp. 31-43, Bilkent University, Ankara, Turkey.

Zhou, Zhenglong et al:"Image-Based Clothes Animation for Virtual Fitting", Article, National University of Singapore, Institute of Software, Chinese Academy of Sciences, Microsoft Research Asia.

Wataru, Naya et al: "Real-Time Image-Based Animation Using Morphing with Human Skeletal Tracking", Proceeding, SUI 2013, Proceedings of the 1st Symposium on Spatial User Interaction, pp. 93, New York, New York.

Hauswiesner, Stefan et al:"Free Viewpoint Virtual Try-On With Commodity Depth Camera", Graz University of Technology, Article.

Giovanni, Stevie et al: "Virtual Try-On Using Kinect and HD Camera", Chapter, Motion in Games, 5th International Conference, MIG 2012, Rennes, France, Nov. 15-17, 2012, pp. 55-65.

Rogge, Lorenz et al: "Garment Replacement in Monocular Video Sequence", Article, Insitut fur Computergraphik, Technische Univeritat Braunschwieg.

Protopsaltou, Dimitris et al: "A Body and Garment Creation Method for an Internet Based Virtual Fitting Room", MIRALab CUI, University of Geneva, Switzerland.

White, Ryan et al: "Retextruing Single Views Using Texture and Shading", Dissertation, Electrical Engineering and Computer Sciences, University of California at Berkeley, Oct. 3, 2015.

Hilsmann, Anna et al: "Tracking and Retexturing Cloth for Real-Time Virtual Clothing Applications", Article, Fraunhofer Heinrich Hertz Institute, Berlin, Germany.

Guo, Yan Wen et al: "Mesh-Guided Optimized Retexturing for Image and Video", Article, Virtualization and Computer Graphics, vol. 14, Issue: 2, pp. 426-439, Mar.-Apr. 2008.

Ehara, Jun et al: "Texture Overlay for Virtual Clothing Based on PCA of Silhouettes", Conference, Mixed and Augmented Reality, Oct. 22-25, 2006.

Movania, Mohammed Mobeen et al: "Depth Image Based Cloth Deformation for Virtual Try-On", Preceeding SIGGRAPH 2013, Article No.: 72, New York, New York.

Jolic, Nebojsa et al: "Computer modeling, Analysis, and Synthesis of Dressed Humans", Circuits and Systems for Video Technology, vol. 9, Issue: 2, pp. 378-388, Mar. 1999.

Rogge, L. et al: "Monocular Pose Reconstruction for an Augmented Reality Clothing System", Vision, Modeling and Virtualization, 2011, University of Applied Sciences, Dresden, Germany.

Freifeld, O. et al: "Contour People: A Parametrized Model of 2D Articulated Human Shape", Computer Vision and Pattern Recognition, Conference, Jun. 13-18, 2010, San Francisco, California.

Yamaguchi, K. et al: "Parsing Clothing in Fashion Photographs", Computer Vision and Pattern Recognition, Conference, Jun. 16-21, 2012, Providence, Rhode Island.

Manfredi, Marco et al: "A Complete System for Garment Segmentation and Color Classification", Manuscript, Machine Vision and Applications, Universita delgi Studi di Modena e Reggio Emilia, Modena Italy.

Gallagher, A.C. et al: "Clothing Cosegmentation for Recognizing People", Conference, Computer Vision and Pattern Recognition, Jun. 23-28, 2008, Anchorage, Alaska.

Cobzas, Dana et al: "Dynamic Textures for Image-based Rendering of Fine-Scale 3D Structure and Animation of Non-rigid Motion", Article, Eurographics, vol. 21 (2002), No. 3, Department of Computing Science, Alberta, Canada.

Wai Lee, Mun et al: "A Model-Based Approach for Estimating Human 3D Posed in Static Images", Article, Pattern Analysis and Machine Intelligence, vol. 28, Issue: 6, pp. 905-916, Jun. 2006.

Yamaguchi, Kota et al: "Paper Doll Parsing: Retrieving Similar Styles to Parse Clothing Items".

Hasan, Basela S. et al: "Segmentation Using Deformable Spatial Priors", Article, School of Computing, University of Leeds, Leeds, United Kingdom, 2010.

Kjaerside, Krista et al: "ARDressCode: Augmented Dressing Room with Tag-based Motion Tracking and Real-Time Clothes Simulation", Conference, Central European Multimedia and Virtual Reality Conference, 2005.

Weber, M. et al: "Part-Based Clothing Segmentation for Person Retrieval", Conference, Advanced Video and Signal-Based Surveillance (AVSS), Aug. 30-Sep. 2, 2011, Klagenfurt.

Cushen, George A. et al: "Real-Time Semantic Clothing Segmentation", Article, University of Southampton, United Kingdom.

Li, W et al: "Interactive Clothing Segmentation Based on JSEG and GRABCUT", Article, Computer Modeling and New Technologies, vol. 17, Issue: 4, pp. 185-190, 2013.

Miaolong, Yuan et al: "A Mixed Reality Virtual Clothes Try-On System", Publication, Multimedia, vol. 15, Issue: 8, pp. 1958-1968, Sep. 4, 2013.

Hilsmann, A. et al: "Pose Space Image Based Rendering", Article, Computer Graphics Forum, vol. 32, Issue: 2, 2013.

Purcher, Jack: "OK Girls—Apple is Introducing the Social Networking Virtual Closet", Web Article, Patently Apple, Jul. 29, 2010.

Manfredi, Marco et al. "A complete system for garment segmentation and color classification." Machine Vision and Applications (2014) 25:955-969.

Miller, Stephen et al. "Parametrized Shape Models for Clothing." 2011 IEEE International Conference on Robotics and Automation, Shanghai International Conference Center, May 9-13, 2011, Shanghai, China. pp. 4861-4868.

Yamada, Hiroki et al. "Image-Based Virtual Fitting System with Garment Image Reshaping." 2014 International Conference on Cyberworlds. pp. 47-54.

Guan, Peng et al. "A 2D Human Body Model Dressed in Eigen Clothing," Computer Vision—ECCV 2010, Part I, LNCS 6311. pp. 285-298.

(56) References Cited

OTHER PUBLICATIONS

Singh, R. et al. "Planar shape recognition by shape morphing." Pattern Recognition The Journal of the Pattern Recognition Society. Pattern Recognition 33 (2000) 1683-1699.
Wang Charlie C. L. et al. "Virtual human modeling from photographs for garment industry." Elsevier. Computer-Aided Design 35 (2003) 577-589.
Hauswiesner, Stefan et al. "Virtual Try-On through Image-Based Rendering." IEEE Transactions on Visualization and Computer Graphics, vol. 19, No. 9, Sep. 2013. pp. 1552-1565.
International Search Report for International Application PCT/EP2015/079633 dated Apr. 21, 2016.

\* cited by examiner

Fig 3A
Fig 3B
Fig 3C
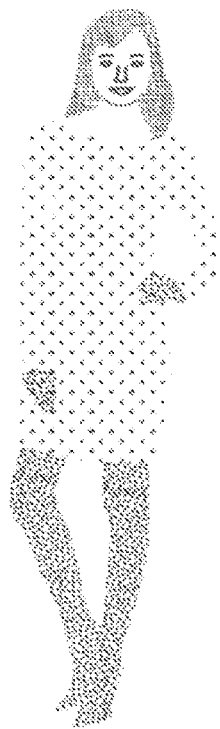
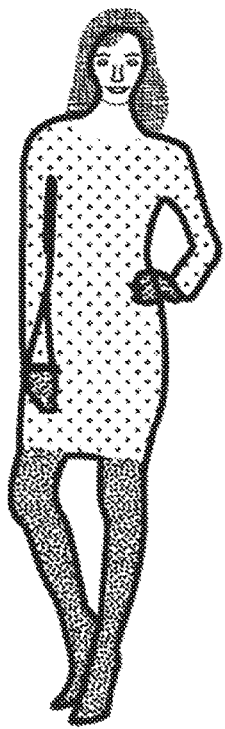
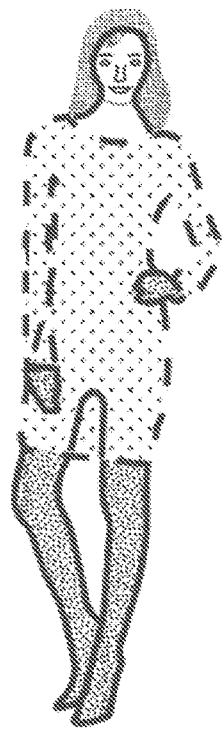
Fig 4A
Fig 4B
Fig 4C
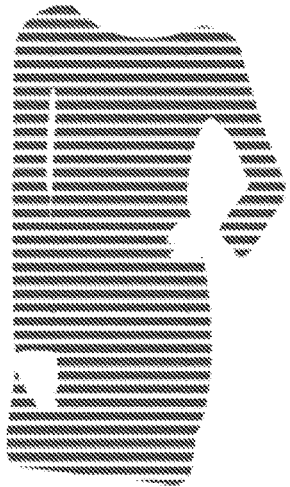
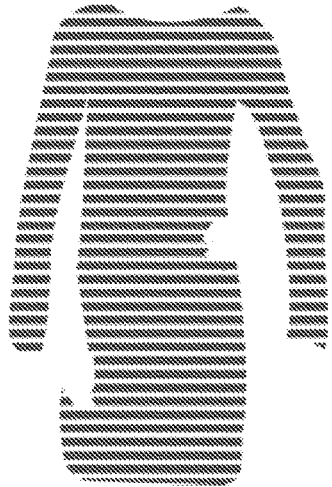
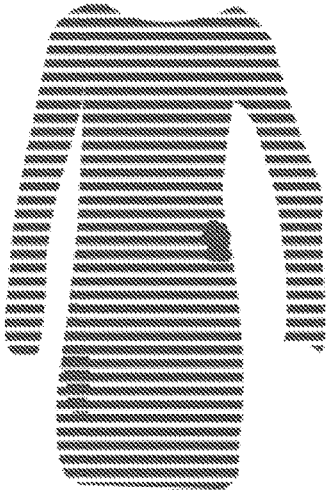

METHOD AND SYSTEM FOR GENERATING GARMENT MODEL DATA

This application is a National Phase entry application of International Patent Application No. PCT/EP2015/079633 filed Dec. 14, 2015, which claims priority to EP 14199802.1 filed on Dec. 22, 2014, the contents of which are herein incorporated by reference in its entirety.

The present disclosure relates to a method for generating garment model data representative of a piece of garment, to a system for generating such garment model data and to a computer program product implementing such a method.

It is becoming more and more popular to buy clothing or other garments over the internet in online shops instead of in high-street shops. One downside of online shopping is that the user cannot try on the different pieces of clothing he or she is interested in. To overcome this fact it has recently been proposed to perform virtual try-on sessions, where pre-processed image data of pieces of clothing or a garment are presented to a user, who can virtually dress an avatar or a picture of the user with the piece of clothing. However, conventional systems of that kind are limited regarding the selection of different garments and a flexible adaptation to an image of the user's body or body parts. In a social networking setup, where users talk about clothes, styles and outfits or trade garments among themselves, the situation may be even more challenging. From an image or photograph of a garment, it is not possible to see how the garment would fit. The same goes for garment images in printed media or photos of stars.

The present disclosure provides an improved concept for generating garment model data that is more flexible with respect to the source or type of input image data.

The improved concept is based on the idea of processing input image data containing a view of the piece of garment to be modelled such that a wearing condition is determined in a first step. For example, it can be distinguished whether the input image data represent a garment that is worn by a person or that is not worn. Based on this differentiation a specific further processing of the input image data is performed. For example, if the piece of garment is determined to be worn, the processing is performed by finding contours of the piece of garment based on a pre-set body model in conjunction with a garment template model retrieved from a garment template model database. In the not worn condition a matching garment template model is determined from the database and used for aligning contours of the garment image with the garment template model. In both cases, the shapes that result from the processing can be used to determine the garment model data which then can be used flexibly with any kind of user photos or, if desired, avatars. Hence, the improved concept allows the use of a broader spectrum of image types, which do not require, e.g., photo studio conditions or other artificial limitations.

The garment template model database preferably is created in a pre-processing step and contains a small set of garment data for each garment category. Garment categories can conform to garment types, such as sweaters, pants, dresses etc. but also to different variants of the same type, such as maxi dresses or long-sleeved shirts. Hence, the garment template model database contains only a subset of available garments. Furthermore, each garment template model stored in the database preferably contains a different amount of information with respect to an exact representation of a piece of garment.

In one embodiment according to the improved concept, a method for generating garment model data representative of a piece of garment comprises processing input image data containing a view of the piece of garment. A type of wearing condition is determined from the input image data as at least one of a first type, where the piece of garment is worn by a person, and of a second type, where the piece of garment is not worn.

If the first type is determined, a shape of the piece of garment and a shape of the person wearing the piece of garment is identified in the input image data utilizing an active contour modelling approach based on a pre-set body model. The identified shapes of the piece of garment and of the person are adapted based on a garment template model retrieved from a garment template model database. The garment model data are determined from the input image data based on the adapted identified shapes.

If the second type is determined, where the piece of garment is not worn, a shape of the piece of garment is identified in the input image data. The input image data are iteratively compared with a respective garment template model retrieved from the garment template model database to identify at least one matching garment template model. The identified shape is aligned with a shape of the at least one matching garment template model and the garment model data are determined from the input image data based on the identified shape and on results of the aligning.

In various implementations of such a method the input image data may be picked from a website through a browser or via a computer application or a smartphone application. The input image data can also result from photographs taken by a user. For example, the user takes a photo of a person wearing the garment or of the garment lying on the floor, hanging on a clothes hanger, worn by a display dummy or mannequin or the like. The improved concept is independent of support of a clothes retailer and does not require special hardware like sensors, marker suits etc. Furthermore, no special skills are required for use, such as modelling, photo editing, aligning or arranging things. Users can also take photographs, scans or screenshots of other media like catalogues, magazines or screens.

For all types of garment images, preferably a body model is aligned with the image of the garment to drape the garment onto a user's body later on.

For example, each of the garment template models stored in the garment template model database contains one or more of the following: a set of control points that define a relationship between a shape of a garment and a body wearing said garment, a geometrical description that defines a relationship between a shape of a garment and a body wearing said garment, metadata associated with a shape of a garment, metadata associated with the type of a garment, metadata associated with fitting information of a garment.

For example, a garment template model may feature a defined number of such control points, wherein at least some of the control points are associated with predefined body parts such as shoulders, hips, ankles, elbows or the like. If no control points are used, or in addition, the geometrical description mentioned above can fulfil the same purpose. Metadata contained by the garment template models may define a basic shape or type of the garment, making e.g. a matching process with an input image faster and/or more reliable. This is particularly the case if the input image data also contain metadata, e.g. provided by the user or obtained from a website or the like. However, such metadata are not mandatory. The fitting information may be information on which garments or garment parts fit a body tightly and which fit loosely.

If the first type is determined, where the piece of garment is worn by a person, adapting the identified shapes may comprise aligning control points contained in the garment template model with corresponding points of the shape of the piece of garment and of the shape of the person. Instead or in addition, the aligning may also be done based on a geometrical description contained in the garment template model, such that a geometrical description of the shape of the piece of garment and of the shape of the person is aligned. For example, such control points and/or geometrical description may be determined on the pre-set body model from the input image data, defining e.g. head, shoulders, arms, legs and the like in conjunction with the aligning of the control points and/or geometrical description of the garment template model associated with the corresponding body parts. Consequently, e.g. both the garment worn by the person and a body of the person are finally found or set in the input image data. Due to the support with the garment template model, this can also be called an extended active contour modelling approach.

In some implementations, if the first type is determined, determining the garment model data comprises separating background image data and body image data, which show parts of the person not being covered by the piece of garment, from the input image data to obtain garment image data. The separating is based on the adapted identified shapes and on colour identification in the input image data. Accordingly, a segmentation of the input image data based on the identified shapes is performed in order to retrieve only those parts of the image showing the piece of garment.

In some specific implementations of such segmentation, if the first type is determined, determining the garment model data may further comprise identifying regions in the garment image data which are occluded, and substituting such identified regions with matching image data. The identifying and/or the substituting can be based on a garment template model retrieved from the garment template model database. The garment template model may be the same as that used during adaptation of the identified shapes or may be a different garment template model that fits better after segmentation of the piece of garment. For example, occluded parts, e.g. by a hand of a user, may disturb a continuous shape of the piece of garment, which is corrected with the part of the garment template model that provides a corrected shape. Previously occluded image regions may then be refilled with e.g. image pattern of the original input image data. Of course, if no occluded regions are present and therefore not identified, no substituting is performed.

In some implementations, if the second type is identified, where the piece of garment is not worn by a person, identifying the matching garment template model may comprise an iterative determination of a similarity metric between the respective garment template model and the input image data and/or the identified shape. The selection of the matching garment template model is based on the iteratively determined similarity metric. A similarity metric may be one or more values that are calculated by comparing single or multiple features of the original input image data and the garment template model. For example, such a comparison may include comparison of shapes, control points, dimensions, geometrical descriptions or the like. The selection may be based on an evaluation of the similarity metric by e.g. calculating a total matching factor from the similarity metric and taking the garment template model with the highest matching factor.

In some implementations where the second type is determined, aligning the identified shape may comprise aligning control points and/or a geometrical description contained in a matching garment template model with corresponding points of the shape of the piece of garment. The control points and/or a geometrical description of the template model preferably are identified before in an initial step.

There are several ways of photographing garments that are not worn. A popular presentation format is to drape the garment on a mannequin. In that case, the mannequin needs to be removed for virtual try-on. Some online shops edit the images such that the mannequin becomes invisible and the back side of the garment can be seen. Some users may opt to lay the clothes on the ground or put them on a hanger for taking pictures. In the latter cases, the backside of the garment needs to be removed. For the last case, the hanger needs to be removed as well.

Hence, in some implementations where the second type is determined, determining the garment model data may comprise obtaining garment image data associated with the piece of garment from the input image data based on the aligned identified shapes. Furthermore, the determination of the garment model data comprises identifying at least one region in the garment image data that would not be visible, if the piece of garment was worn by a person, and excluding such an identified region from the garment image data and the garment model data. For example, a frontal image of a shirt with a neckline usually also includes part of the back side of the shirt, which is not visible when the shirt is worn by a person. Hence, such a region can be excluded in the output garment model data. However, if no such regions can be identified, e.g. because they are simply not present, no exclusion is performed in consequence.

For example, the identification of such a region comprises a determination of image gradients in the garment image data, comparing the image gradients to a set of geometrical shapes to achieve a matching quantity for each of the geometrical shapes, selecting one of the geometrical shapes based on the matching quantities, and defining the at least one region based on the selected geometrical shape.

For example, a plurality of ellipse equations with different parameters define the set of geometrical shapes that are compared to the image gradients of the input image data. The better a single equation matches to the image gradient, the higher is the probability that such a shape defines an edge of a region to be excluded from the input image data. In some embodiments a single equation may be sufficient to define such an edge, whereas in other situations two or more equations may be necessary for defining the shape of the region. The number and type of equations can be made dependent on the type of garment, for example.

In some input image data sleeves or pant legs may be close to each other or other body parts. As a consequence, it may be harder to transform these garment parts. Accordingly, in some implementations the determination of the garment model data may further comprise, if the piece of garment includes a sleeve or a pant leg, identifying a first and a second point along the sleeve or the pant leg, respectively. Furthermore, image gradients are determined in the input image data, and the image gradients are compared to a set of interconnection paths between the first and the second point to achieve a matching quantity for each of the interconnection paths. One of the interconnection paths is selected based on the matching quantities to be used as separation information in the garment model data.

The process of generating garment model data may be performed based on conventional images showing a two-dimensional representation of the piece of garment. The conventional images may be still images or single images from a video sequence. Hence, the output garment model data may also be representative of a two-dimensional view of the piece of garment.

However, in some implementations the garment model data are generated such that they contain depth information and/or three-dimensional information. For example, the input image data containing a view of the piece of garment may already contain depth information or three-dimensional information, which may be generated in a special imaging process using, e.g. infrared imaging techniques or other 3D imaging techniques known in the art. The input image data may also be provided as a two-dimensional or three-dimensional video sequence or animation, from which the depth information or three-dimensional information may be extracted.

In such a case, the processing may be performed in three dimensions such that the resulting garment model data contain a three-dimensional representation of the piece of garment. As an alternative or in addition, the garment template models stored in the garment template model database may contain three-dimensional and/or depths information which is aligned and/or adapted to the shapes in the input image data. This also works if the input image data are two-dimensional. For example, the garment image data may be enhanced with the three-dimensional or depth information from the garment template model.

The determination of the type of wearing condition may be performed based on one or more factors associated with the input image data. Examples for bases are a face detection, a body detection, a body part detection, when for example no full body is visible, a detection of skin regions like hands, arms, legs or feet, a hair detection or a garment recognition. Furthermore, the determination can be based on a wearing condition indicated in metadata comprised by the input image data.

In various implementations the retrieval of garment template models from the garment template model database may be based on additional information that may be comprised by the input image data. For example, a type of garment can be indicated in metadata comprised by the input image data. Furthermore, a shooting condition may be indicated in metadata comprised by the input image data. For example, such a shooting condition may indicate whether the piece of garment is lying on the floor, hanging on a clothing hanger or the like. Furthermore, a shooting angle may be indicated in metadata comprised by the input image data. For example, if a piece of garment which is lying on the floor or on a bed or the like is photographed with a mobile phone including a position, orientation and/or acceleration sensor, the shooting angle provided by the respective sensor may indicate that the photo was taken in a downward direction.

The various embodiments and implementations described above for performing the generation of garment model data according to the improved concept may be implemented in a system, in particular in a computer system. For example, such a system comprises a processor that is configured for executing the various processing steps described above. For example, such a system may be integrated in a mobile phone, a tablet computer, a notebook or a desktop computer or similar equipment. The garment template model database may be stored on the system or device, respectively, or stored on a remote computer which is accessed over a remote connection, e.g. a network connection.

Furthermore, it should be noted that depending on the circumstances, the improved concept may also be implemented in software or as a computer program product comprising respective program code. Implementation may be performed on a digital storage medium, in particular a disk or a CD having electronically readable control signals that may cooperate with a programmable computer system such that the corresponding method is performed. Generally, a solution according to the improved concept thus also consists in a computer program product having a program code, stored on a machine-readable carrier, for performing the method according to the improved concept, when the computer program product runs on a computer.

The text below explains implementations of the improved concept in detail using exemplar) embodiments with reference to the drawings.

In the drawings:

FIG. 3A shows a model wearing a dress:

FIG. 3 shows a result of a standard active contour modelling approach;

FIG. 3B shows a result of a standard active contour modelling approach;

FIG. 3C shows a result of an extended active contour modelling approach according to the improved concept, where both body and garment shape are estimated;

FIG. 4A, FIG. 4B and FIG. 4C show example images during the process of substituting occluded image parts;

Figure 1:
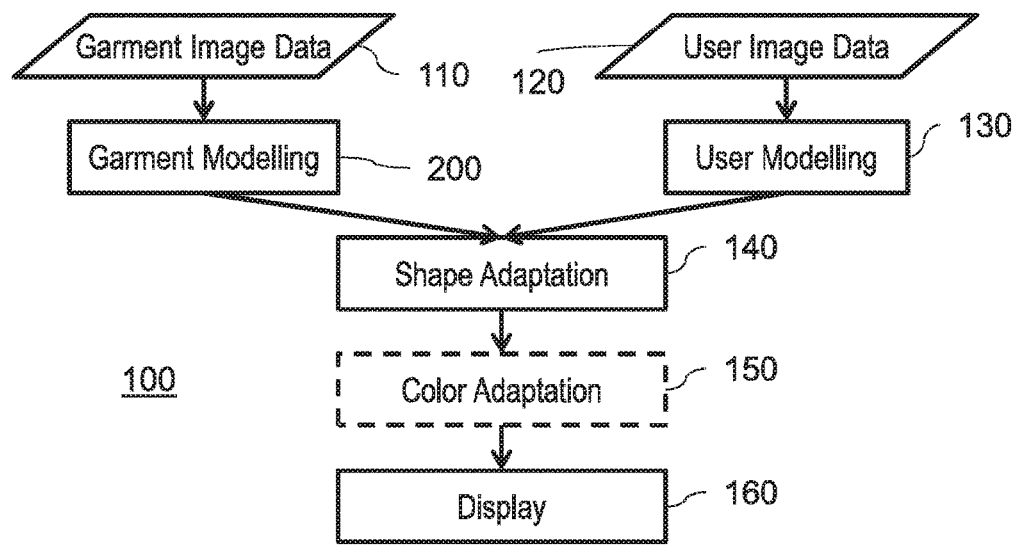
FIG. 1 shows a flowchart of an example implementation of a virtual try-on session.

FIG. 1 shows an example flowchart of a virtual try-on session 100. In such a session a composited image may be created that shows a user wearing selected clothes or garments. The inputs of such a virtual try-on session are garment image data 110 and user image data 120. Such image data 110, 120 may include photos of the piece of garment to be virtually worn by the user and photos of the user. For example, the garment image data and/or the user image data may comprise photos or images of a piece of garment, respectively the user, and additional information related to the image.

Garment images can be picked from a website, e.g. using a specific browser plugin, or using a specific application. It is also possible to use garment images photographed by the user. The example session 100 starts with two separate process chains for the garment image and the user photo that converge in a merging step and several post-processing steps. In particular, in block 200 a garment model represented by garment model data is generated from the garment image data. Similarly, user data may be modelled in block 130 from the user image data 120. In block 140 the garment model data are combined with the user data. In this block 140 a body model of the user's photo is aligned with the garment model data in order to adapt the garment's shape and pose to that of the user data. This may be done by computing necessary rigid and non-rigid transformations, e.g. by employing a variant of Laplacian mesh editing.

In a following optional block 150 a colour adaptation is performed. This may be necessary if the quality of the user photo and the garment photo differ, e.g. by contrast, saturation or brightness. Accordingly, the better quality photo may be adapted to the lower quality photo, or vice versa. Additionally, lighting of a garment image can be adapted to the lighting of the user image. This may be achieved by subtracting the lighting of the garment scene and adding the lighting of the user scene.

As a result of the above processing steps, the composited image showing the user with the piece of garment can be displayed in block 160. The result may either be a still image or a sequence of images showing an animation of the try-on computation. Result images can be shown in an overlay of an existing website, embedded in an existing website, possibly replacing original content. Results can also be shown on a personal website of the user, in social network applications, or attached to mails etc. Furthermore, the results can be shown on the display of a mobile device like a smartphone or tablet, preferably within a mobile application implementing the improved concept.

Figure 2:
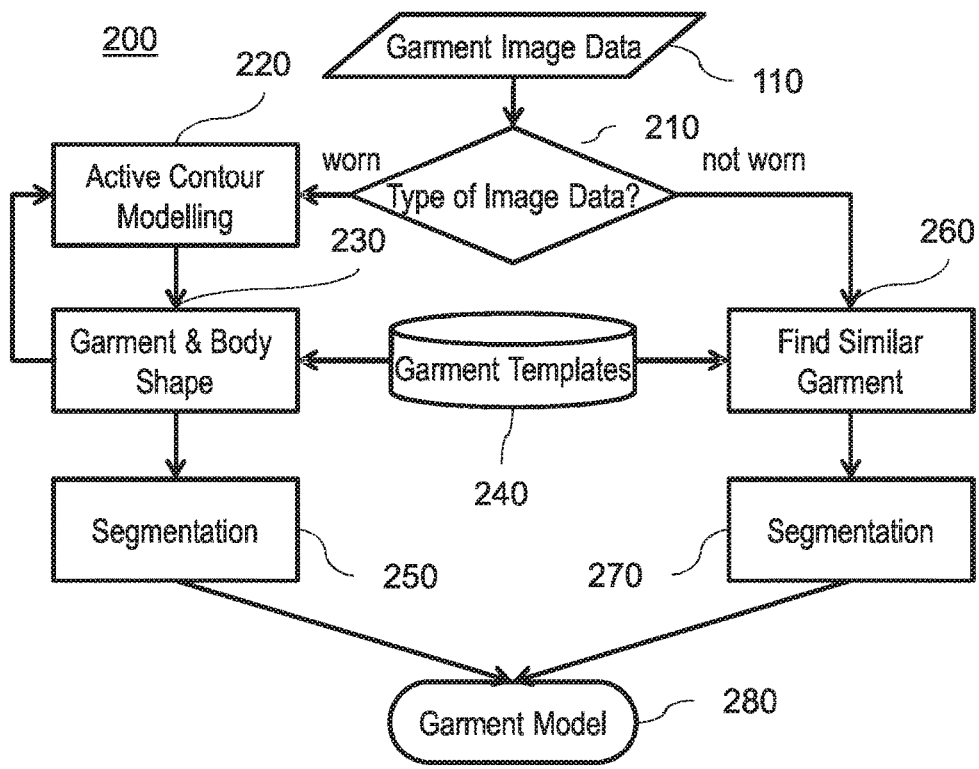
FIG. 2 shows a flowchart of an example process of generating garment model data.

FIG. 2 shows an example flowchart of the process 200 of generating garment model data representative of a piece of garment according to the improved concept. According to this concept, all types of garment images, in particular frontal garment images, can be processed. For example, the images or photos can be with or without a human model or a mannequin, can lie on the floor, on a clothing hanger or the like. According to the improved concept the garment model data generation process is independent of support of a retailer of the clothing. Furthermore, it does not require special hardware such as sensors, marker suits or the like. Additionally, no special skills like modelling, photo editing, aligning or arranging things are necessary.

According to the improved concept it is distinguished between at least two major types of fashion images, as indicated by decision block 210. The first type contains pictures of people wearing clothes, such as models or users or even full-sized mannequins. The second type contains garments that are not worn by anyone, such as garments on a hanger. The garment images to be analysed, included in the garment image data 110, may be picked up from a website or be taken by the user from real pieces of garment or clothes. As an alternative also photographs, scans or screenshots of other media like catalogue, magazine or screens can be provided.

For example, in decision block 210 a type of wearing condition is determined from the input image data as at least one of a first type, where the piece of garment is worn by a person, and of a second type, where the piece of garment is not worn. Such determination of the type of wearing condition may be performed based on various decision sources. For example, a face detection, a body detection, a body part detection, a detection of skin regions or a hair detection, may be used. In addition or as an alternative, the garment image data 110 may comprise metadata that indicate the type of wearing condition in advance.

If the first type is determined, where the piece of garment is worn, the processing continues with processing block 220, where an active contour modelling is performed. For example, the body of the model or a user can be used to estimate the garment's scale and fit. However, statistical body models usually describe human bodies in an undressed state. If, for example, the garment does not fit tightly to the user's body, as a consequence a standard active contour modelling approach may have difficulties in detecting, for example, the legs of the model when a dress is worn. For example FIG. 3A shows a model wearing a dress. FIG. 3B shows a standard active contour modelling approach on the basis of the image of FIG. 3A, which results in that the body under the dress is not properly estimated. Hence, according to the improved concept an extended active contour modelling approach is used. It may be initialized with a face detector and a statistical body model. For example, in processing block 220 a shape of the piece of garment and a shape of the person wearing the piece of garment are identified in the input image data utilizing the active contour modelling approach based on a pre-set body model, e.g. the statistical body model.

In continuation of the extended active contour modelling approach, in processing block 230 the identified shapes are adapted based on a garment template model retrieved from a garment template model database 240. For example, retrieving the garment template model from the garment template model database 240 is based on a type of garment indicated in metadata comprised by the input image data. In addition or as an alternative, the retrieval can also be based on garment recognition. The garment template database 240 may be created in a pre-processing step. It can contain a small set of garment images for each garment category. Garment categories can conform to garment types, like sweaters, pants, dresses or the like, but also to different variants of the same type like maxi dresses or long-sleeved shirts.

From processing block 230 it may be returned to processing block 220 with the adapted identified shapes for improving the active contour modelling. For example, the contours of a garment follow the deformations of the underlying body model, for example by a skeleton animation approach. In addition, deformations relative to the model like skirt length, sleeve length, tightness, may be considered by the contour modelling algorithm. Depending on the type of garment, one or more templates from the garment template database may be adapted to the image. A matching value can be calculated for each of the garment template models, including both matching of the body shape and the garment shape. Preferably, the garment template models with the best matching value are taken for further processing in processing block 250. Hence, as a result of processing blocks 220 and 230, a shape of the piece of garment and a shape of the person wearing the piece of garment may be detected simultaneously, such that a relationship like that shown in FIG. 3C can be established. FIG. 3C shows an example result of the improved concept, in particular with respect to the extended active contour modelling approach, where both body and garment shape are correctly estimated. There the body shape is indicated by the solid line, as in FIG. 3B, and the garment shape is indicated by the dashed line.

The process of generating garment model data may be performed based on conventional images showing a two-dimensional representation of the piece of garment. However, in some implementations the garment model data are generated such that they contain depth information and/or three-dimensional information. For example, the input image data containing a view of the piece of garment may already contain depth information or three-dimensional information, which may be generated in a special imaging process using, e.g. infrared imaging techniques or other 3D imaging techniques known in the art.

Hence, when the input image data contain depth information, the body model can be a three-dimensional surface model, e.g. a mesh, that is aligned with the depth samples of the input image.

When the input image data do not contain depth information, the body model may be a two-dimensional body pose and shape model that can be used to describe the silhouette or shape of the user. As an alternative or in addition, the garment template models stored in the garment template model database may contain three-dimensional and/or depth information which is aligned and/or adapted to the shapes in the input image data. This also works if the input image data are two-dimensional. For example, the garment image data may be enhanced with the three-dimensional or depth information from the garment template model.

In processing block 250 a segmentation of the input image data is performed. For example, the garment model data are determined from the input image data based on the adapted identified shapes from processing blocks 220 and 230. Each of the garment template models stored in the garment template model database 240 may contain a set of control points that define a relationship between a shape of a garment and a body wearing said garment. It is also a possible implementation that each of the garment template models contains a geometrical description defining such relationship. Other information contained in a garment template model may be metadata associated with a shape of a garment and/or with a type of a garment. Of course, each garment template model can contain a combination of the information described above and also additional information.

For example, adapting the identified shapes in processing blocks 220 and 230 may comprise aligning control points contained in the garment template model with corresponding points of the shape of the piece of garment and of the shape of the person. Such control points may for example relate to specific body parts or body positions such as shoulders, arms, hips, legs or the like.

In block 250 the image data corresponding to the piece of garment may be separated from the input image data based on the identified shapes. For example, background and body parts are removed from the input image data to have image data for the resulting garment model data.

For example, a statistical model of the skin colour of the model is computed from a face region in the image data. When cloth sample images are available, a colour model of the garment can also be computed. The image data may be labelled according to the similarity with the colour models. From the garment type, which may be known from the garment template model, a second label map can be computed that reflects likely garment positions. For example, it is assumed that pants are usually not found in the upper body half. Depending on the combined label score and neighbourhood, pixels may be classified as garment and non-garment. All non-garment pixels are to be replaced later with the user's photo as described above in conjunction with block 140 of FIG. 1.

More generally, determining the garment model data in processing block 250 may comprise separating background image data and body image data, which show parts of the person not being covered by the piece of garment, from the input image data to obtain garment image data. As described before, the separating is based on the adapted identified shapes and on colour identification in the input image data.

If the input image data contain a view of piece of garment having no overlapping parts or the like, the processing in segmentation block 250 may be finished, resulting in the final garment model data 280. However, if parts of the garment are overlapping or occluded, further processing may be necessary.

Referring to FIG. 4A, garment image data are shown which are, for example, based on the original image data of FIG. 3A where body parts such as head, legs and hands are removed. As can be seen from FIG. 4A, some parts of the garment image data are occluded by a model's hands. In such a case, the segmentation process in block 250 of FIG. 2 may further comprise identifying regions in the garment image data which are occluded, and substituting such identified regions with matching image data. The identifying and/or the substituting may be based on a garment template model retrieved from the garment template model database 240.

Referring to FIG. 4B, the sleeves of the dress are separated from their original position using the information of a garment template model. This can be the same as used in the shape identification adaptation process, but can also be another garment template model retrieved from the garment template model database 250. As can be seen from FIG. 4B, the occluded parts are still present and are preferably filled in with a matching pattern. The result of such an operation is shown as an example in FIG. 4C. The most probable shape of the garment is, for example, taken from the garment template model.

Referring back to FIG. 2, now the case of the second type of wearing condition, where the piece of garment is not worn, will be described. For example, in processing block 260 a similar garment is to be found. For example, a shape of the piece of garment is identified in the input image data. Furthermore, the input image data is iteratively compared with a respective garment template model retrieved from the garment template model database 240 to identify a matching garment template model. For example, a similarity metric is iteratively determined between the respective garment template model and the input image data and/or the identified shape. The matching garment template model may be selected based on the iteratively determined similarity metric.

Figure 5:
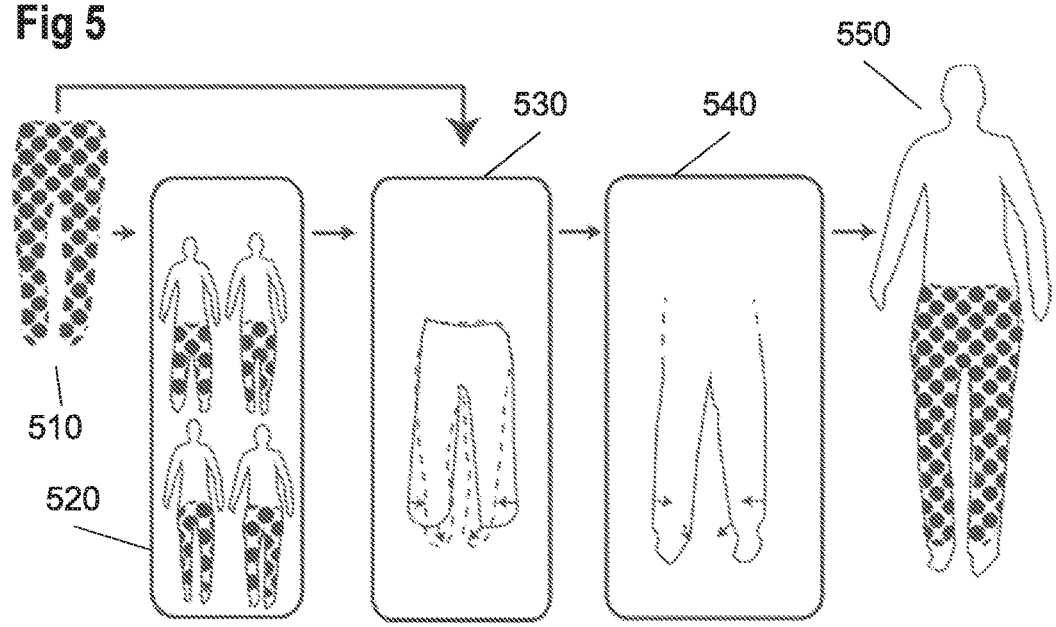
FIG. 5 shows an example flowchart of a matching process in conjunction with the garment template model database.

Referring to FIG. 5, an example flowchart of the process of processing block 260 is shown. For example, in an initial step the garment image data, denoted by numeral 510, are presented, representative of an example pair of trousers. Based on the image data and/or the shape of the trousers a comparison is performed with various garment template models for such trousers in processing block 520. To determine the similarity metric in this comparison, information about the garment category, silhouettes, segmentation masks or other image features can be used. The most similar garment template model is then automatically aligned to the shape of the piece of garment identified before. Of course, if more than one template model is to be identified, the most similar garment template models are aligned to the shape of the piece of garment identified before. The alignment process is, for example, shown in block 530. This procedure can use non-rigid image alignment on the silhouette images. In block 540 control points of the garment template model may be morphed according to such image alignment operation. As a result, a well-fitting garment model can be obtained for a given garment input image data. The result of the aligning is shown as an example in step 550.

Figure 6A:
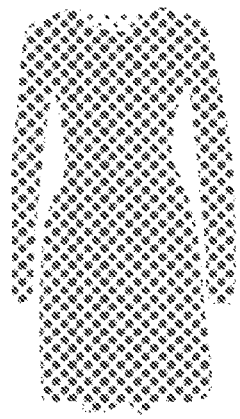
FIG. 6A and FIG. 6B show example images in an alignment process.
Figure 6B:
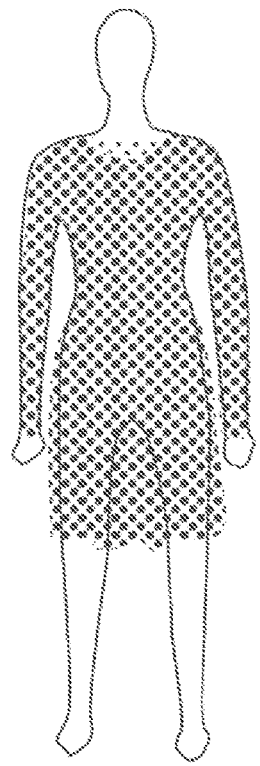

Referring to FIG. 6A and FIG. 6B, image data of a dress not worn by a person is shown. In FIG. 6A the garment image data are shown as originally presented. In FIG. 6B a human body model is additionally depicted, representing the information retrieved from the garment template model database for this kind of garment. Hence, not only the shape of the garment is included in the output garment model data but also the relationship to the human body, which for example may be needed in a later virtual try-on process, as described for example for FIG. 1.

Referring back to FIG. 2, in processing block 270 a segmentation of the input image data can be performed based on the identified shape and on results of the aligning in order to determine the garment model data in processing block 280. Similar to the case described above where a garment is worn, aligning the identified shape may comprise aligning control points contained in a matching garment template model with corresponding points of the shape of the piece of garment.

If only a front side of the garment to be modelled is visible in the input image data, the modelling process may be finished. However, in some cases back sides of the garment are visible in the input image data, for example necklines or inner parts of trousers. In such a case determining the garment model data may comprise obtaining garment image data associated with the piece of garment from the input image data based on the aligned identified shapes and further comprises identifying at least one region in the garment image data that would not be visible if the piece of garment was worn by a person. Such identified regions are excluded from the garment image data and the garment model data. If no such regions can be identified, e.g. because they are simply not present, no exclusion is performed in consequence.

For example, the identification of such a region may be performed by determining image gradients in the garment image data and comparing these image gradients to a set of geometrical shapes to achieve a matching quantity for each of the geometrical shapes. Finally, one of the geometrical shapes is selected based on the matching quantities and used for defining the at least one region. Such geometrical shapes may be ellipses or lines or other geometrical forms that are varied with a number of parameters.

Figure 7A:
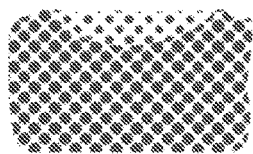
FIG. 7A, FIG. 7B and FIG. 7C show example images of identification of regions to be excluded.
Figure 7B:
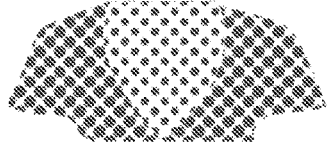

Referring to FIG. 7A, image data representing the upper part of a dress is shown, wherein the light dotted area is a back side or inner side of the dress. In the upper part of FIG. 7A, the original input image data, or at least a part of it, are shown, whereas in the lower part of FIG. 7A an ellipse is included defining the border of region to be excluded. For example, for each shape of the set of geometrical shapes a coincidence of the shape with an image gradient along the shape is calculated. For example, an image gradient, a determination of which is well known in the art, has significant values if there are transitions between regions of different brightness or the like. Finally, the shape having the highest coincidence with the image gradient is chosen for the definition of the region.

A further example of such region identification is shown in FIG. 7D, representing a top with a visible back side in the neckline region. Also in this case the region can be defined by a set of geometrical shapes. As a difference to the example of FIG. 7A, two ellipse equations are employed to define the shape, respectively the region.

Figure 7C:
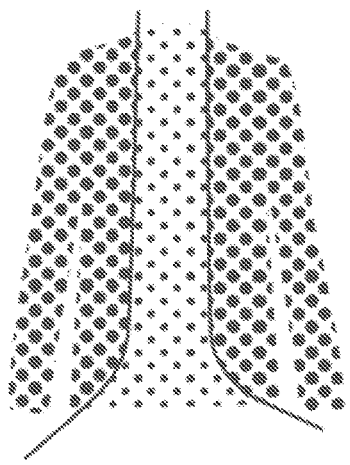

FIG. 7C shows a further example, wherein a back side of a smoking or dinner jacket is removed based on the same principle.

The comparison between the geometrical shapes and the image gradients can be limited to specific regions of the garment image data. For example, it may be a generally good assumption to search for regions to be excluded in the upper part of the image. Different approaches may be necessary for some types of garments. Hence, such region identification may further be based on the type of garment being identified.

In some input image data corresponding to both types of wearing condition, sleeves or pant legs may be close to each other or other body parts. As a consequence, transformation of such garment parts may become difficult during a non-rigid image registration process if an independent transformation is desired. Such an image situation is, for example, shown in FIG. 8A where the sleeves of a sweatshirt are close to the body part of the sweatshirt itself.

To overcome such situation, a first and a second point along the sleeve or the pant leg can be identified, which preferably can be detected reliably such as an armpit or crotch or a point close to the hip or ankle. Preferably the first and the second point lie on the garment's silhouette. Between the first and the second point several cut hypotheses are evaluated by matching them with garment image gradients. For example, such image gradients are determined in the input image data and are compared to a set of interconnection paths between the first and the second point to achieve a matching quantity for each of the interconnection paths.

Figure 8A:
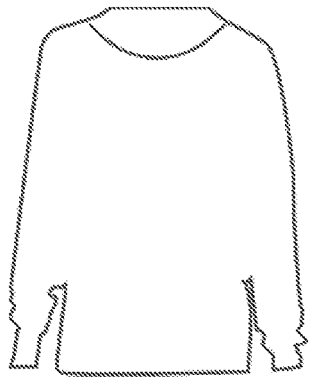
FIG. 8A, FIG. 8B and FIG. 8C show example images in the process of separating sleeves.
Figure 8B:
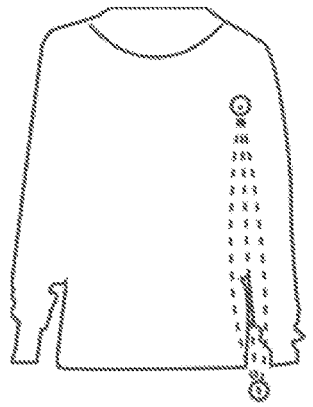
Figure 8C:
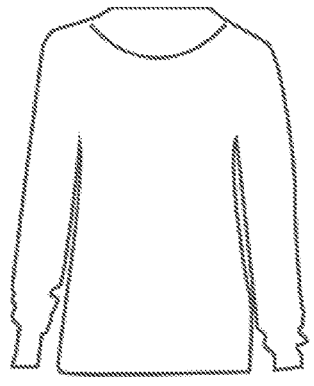

An example for such interconnection paths and the selection of the first and the second point is, for example, shown in FIG. 8B, where the first point is in the armpit and the second point is close to the hip. Based on the matching quantities, one of the interconnection paths is selected as separation information in the garment model data. For example, the best cut or separation is executed by inserting background pixels or passing such information with the garment model data. The result is that the sleeves or pant legs to not stick to other parts during non-rigid image registration, which enables a more realistic try-on result. For example, a separated version of the image of FIG. 8A is shown in FIG. 8C.

In some input image data the photo may contain a perspective distortion resulting e.g. from an angle in which the photograph is taken. Such perspective distortion of the photo may be compensated if information is present that allows determination of the grade of perspective distortion. For example, if a door, a doorframe, a screen frame, a rectangular catalogue outline or the like is present in the input image data, respective lines can be detected to form a rectangle in the image, the detection for example being based on a Hough transform. If a rectangle was found, the four angles may be used to determine a perspective homography for unwarping the image. Additionally or as an alternative, a shooting angle of the photograph taken may be evaluated, wherein such shooting angle may be provided by a position, orientation or acceleration sensor in a camera or smartphone.

As mentioned before, the garment model data may contain a set of control points or a geometrical description that define a relationship between a shape of the garment and a body wearing said garment. Such information can later on be used when the garment model data are combined with the user image data, as is described before for block 140 of FIG. 1.

Figure 9A:
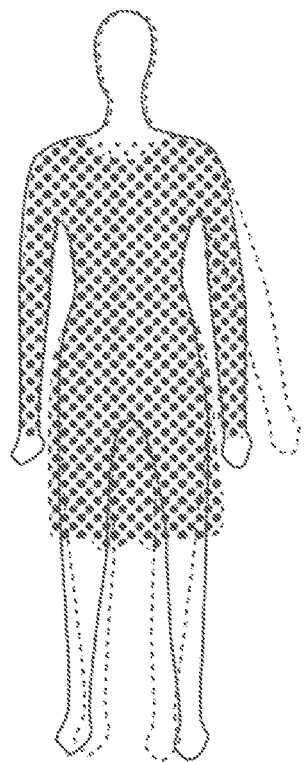
FIG. 9A, FIG. 9B and FIG. 9C show example images in the process of garment shape adaptation.

Referring to FIG. 9A, an example of garment model data with an underlying body model, denoted by a solid line, is shown. This basically corresponds to the image shown in FIG. 6B. However, additionally in FIG. 9A a dashed outline of a user body is shown, having slightly different leg and arm positions.

Figure 9B:
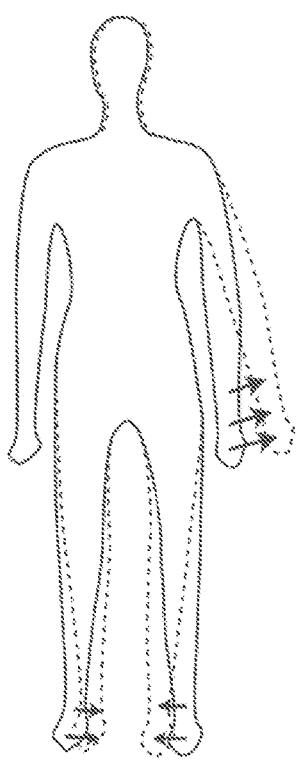
Figure 9C:
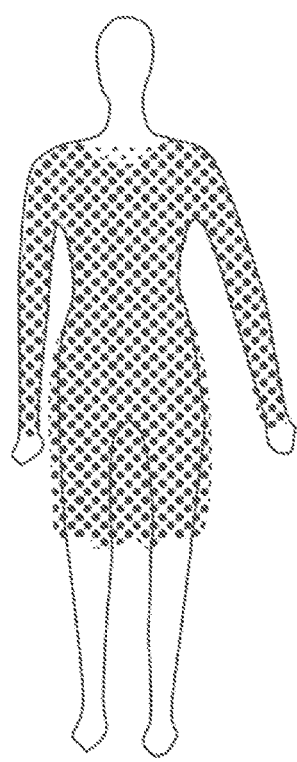

Referring now to FIG. 9B, the body model of the garment model data can be aligned with the shape of the user, which can be used as a basis for image transformation. For example, FIG. 9C shows the result where also the garment image data are transformed by rigid and non-rigid transformations to match with the user's body. For example, a variant of Laplacian mesh editing is used in this case.

Regarding the two types of image data, where the garment is worn or not worn, it should be noted that there may be input image data which may be more difficult to classify. For example, if a piece of garment like a dress is worn by a full body mannequin being visible in the input image data, such an image may be determined as being of the first type where the garment is worn. On the other hand, image data of garment worn by a person but missing significant body parts, may be determined as the second type of garment not worn. For example, if the head or legs are not included in the input image data, such images may also be processed as the second type. More generally speaking, input images which include a relationship between a body model and the piece of garment may be categorized as the first type. Accordingly, images which do not inherently provide a relationship between the piece of garment and the underlying body model may be categorized as the second type.

Figure 10:
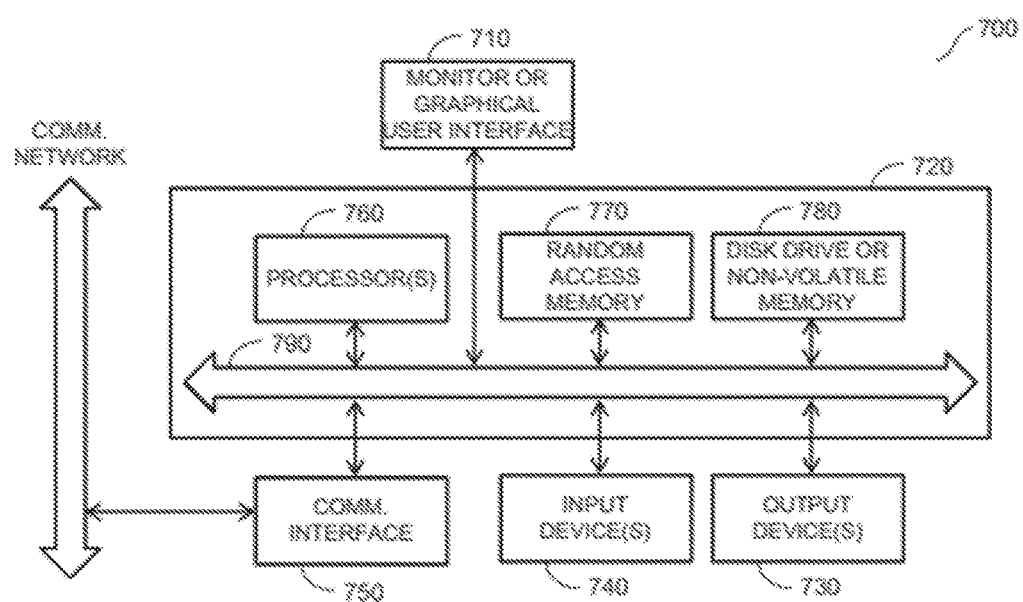
FIG. 10 is a block diagram of one embodiment of a computer system that may be used for implementing the improved concept.

FIG. 10 is a block diagram of a computer system that may incorporate embodiments according to the improved concept. FIG. 10 is merely illustrative of an embodiment incorporating the improved concept and does not limit the scope of the invention as recited in the claims. One of ordinary skill in the art would recognize other variations, modifications, and alternatives.

In one embodiment, computer system 700 typically includes a monitor 710, a computer 720, user output devices 730, user input devices 740, communications interface 750, and the like.

As shown in FIG. 10, computer 720 may include a processor(s) 760 that communicates with a number of peripheral devices via a bus subsystem 790. These peripheral devices may include user output devices 730, user input devices 740, communications interface 750, and a storage subsystem, such as random access memory (RAM) 770 and disk drive 780.

User input devices 730 include all possible types of devices and mechanisms for inputting information to computer system 720. These may include a keyboard, a keypad, a touch screen incorporated into the display, audio input devices such as voice recognition systems, microphones, and other types of input devices. In various embodiments, user input devices 730 are typically embodied as a computer mouse, a trackball, a track pad, a joystick, wireless remote, drawing tablet, voice command system, eye tracking system, and the like.

User input devices 730 typically allow a user to select objects, icons, text and the like that appear on the monitor 710 via a command such as a click of a button or the like. User input devices 730 may also include color and/or depth cameras, body shape and/or pose tracking sensors, hand tracking devices, head tracking devices or the like.

User output devices 740 include all possible types of devices and mechanisms for outputting information from computer 720. These may include a display (e.g., monitor 710), non-visual displays such as audio output devices, etc.

Communications interface 750 provides an interface to other communication networks and devices. Communications interface 750 may serve as an interface for receiving data from and transmitting data to other systems. Embodiments of communications interface 750 typically include an Ethernet card, a modem (telephone, satellite, cable, ISDN), (asynchronous) digital subscriber line (DSL) unit, FireWire interface, USB interface, and the like. For example, communications interface 750 may be coupled to a computer network, to a FireWire bus, or the like. In other embodiments, communications interfaces 750 may be physically integrated on the motherboard of computer 720, and may be a software program, such as soft DSL, or the like.

In various embodiments, computer system 700 may also include software that enables communications over a network such as the HTTP, TCP/IP, RTP/RTSP protocols, and the like.

RAM 770 and disk drive 780 are examples of tangible media configured to store data, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 770 and disk drive 780 may be configured to store the basic programming and data constructs that provide the functionality of the improved concept.

Software code modules and instructions that provide the functionality of the improved concept may be stored in RAM 770 and disk drive 780. These software modules may be executed by processor(s) 760. RAM 770 and disk drive 780 may also provide a repository for storing data used in accordance with the present invention.

RAM 770 and disk drive 780 may include a number of memories including a main random access memory (RAM) for storage of instructions and data during program execution and a read only memory (ROM) in which fixed instructions are stored. RAM 770 and disk drive 780 may include a file storage subsystem providing persistent (non-volatile) storage for program and data files. RAM 770 and disk drive 780 may also include removable storage systems, such as removable flash memory.

Bus subsystem 790 provides a mechanism for letting the various components and subsystems of computer 720 communicate with each other as intended. Although bus subsystem 790 is shown schematically as a single bus, alternative embodiments of the bus subsystem may utilize multiple busses.

FIG. 10 is representative of a computer system capable of embodying the improved concept. It will be readily apparent to one of ordinary skill in the art that many other hardware and software configurations are suitable for such use. For example, the computer may be a mobile device, in particular a mobile phone, or desktop, portable, rack-mounted or tablet configuration. Additionally, the computer may be a series of networked computers.

Various embodiments of the improved concept can be implemented in the form of logic in software or hardware or a combination of both. The logic may be stored in a computer readable or machine-readable storage medium as a set of instructions adapted to direct a processor of a computer system to perform a set of steps disclosed in embodiments of the improved concept. The logic may form part of a computer program product adapted to direct an information-processing device to automatically perform a set of steps disclosed in embodiments of the improved concept.

The specification and drawings are, accordingly, to be regarded in an illustrative rather than a restrictive sense. However, it will be evident that various modifications and changes may be made thereunto without departing from the scope of the invention as set forth in the claims.

The invention claimed is:

1. A method for generating garment model data representative of a piece of garment, the method comprising processing, using a processor, input image data retrieved from a storage location in a memory, the input image data containing a view of the piece of garment;

determining, using the processor, a type of wearing condition from the input image data as at least one of a first type, where the piece of garment is worn by a person, and of a second type, where the piece of garment is not worn;

if the first type is determined,
  identifying, using the processor, a shape of the piece of garment and a shape of the person wearing the piece of garment in the input image data utilizing an active contour modelling approach based on a preset body model;
  adapting, using the processor, the identified shape of the piece of garment and the identified shape of the person, of the piece of garment and the identified shape of the person, based on a garment template model retrieved from a garment template model database stored in the memory; and
  determining, using the processor, the garment model data from the input image data based on the adapted identified shapes; and if the second type is determined,
  identifying, using the processor, a shape of the piece of garment in the input image data;
  iteratively comparing the input image data with a respective garment template model retrieved from the garment template model database to identify at least one matching garment template model;
  aligning, using the processor, the identified shape with a shape of the at least one matching garment template model; and
  determining, using the processor, the garment model data from the input image data based on the identified shape and on results of the aligning.

2. The method according to claim 1, wherein each of the garment template models stored in the garment template model database contains at least one of the following:
  a set of control points that define a relationship between a shape of a garment and a body wearing said garment;
  a geometrical description that defines a relationship between a shape of a garment and a body wearing said garment;
  metadata associated with a shape of a garment;
  metadata associated with a type of a garment;
  metadata associated with fitting information of a garment.

3. The method according to claim 1, wherein adapting the identified shapes comprises aligning control points and/or a geometrical description contained in the garment template model with corresponding points and/or a geometrical description of the shape of the piece of garment and of the shape of the person.

4. The method according to claim 1, wherein, if the first type is determined, determining the garment model data comprises separating background image data and body image data, which show parts of the person not being covered by the piece of garment, from the input image data to obtain garment image data, the separating being based on the adapted identified shapes and on color identification in the input image data.

5. The method according to claim 4, wherein, if the first type is determined, determining the garment model data further comprises identifying regions in the garment image data, which are occluded, and substituting such identified regions with matching image data, the identifying and/or the substituting being based on at least one garment template model retrieved from the garment template model database.

6. The method according to claim 1, wherein identifying the at least one matching garment template model comprises iteratively determining a similarity metric between the respective garment template model and the input image data and/or the identified shape, and selecting the matching garment template model based on the iteratively determined similarity metrics.

7. The method according to claim 1, wherein aligning the identified shape comprises aligning control points and/or a geometrical description contained in the at least one matching garment template model with corresponding points and/or a geometrical description of the shape of the piece of garment.

8. The method according to claim 1, wherein, if the second type is determined, determining the garment model data comprises obtaining garment image data associated with the piece of garment from the input image data based on the aligned identified shapes, and further comprises identifying at least one region in the garment image data that would not be visible, if the piece of garment was worn by a person, and excluding such identified region from the garment image data and the garment model data.

9. The method according to claim 8, wherein, if the second type is determined, identifying at least one region comprises determining image gradients in the garment image data, comparing the image gradients to a set of geometrical shapes to achieve a matching quantity for each of the geometrical shapes, selecting one of the geometrical shapes based on the matching quantities, and defining the at least one region based on the selected geometrical shape.

10. The method according to claim 1, wherein determining the garment model data further comprises, if the piece of garment includes a sleeve or a pant leg, identifying a first and a second point along the sleeve or the pant leg, respectively, determining image gradients in the input image data, comparing the image gradients to a set of interconnection paths between the first and the second point to achieve a matching quantity for each of the interconnection paths, and selecting one of the interconnection paths based on the matching quantities to be used as separation information in the garment model data.

11. The method according to claim 1, wherein the garment model data are generated such that they contain depth information and/or 3-dimensional information.

12. The method according to claim 1, wherein the determination of the type of wearing condition is performed based on at least one of the following:
  face detection;
  body detection;
  body part detection;
  detection of skin regions;
  hair detection;
  garment recognition;
  a wearing condition indicated in metadata comprised by the input image data.

13. The method according to claim 1, wherein retrieving a garment template model from the garment template model database is based on at least one of the following:
  a type of garment indicated in metadata comprised by the input image data;
  a shooting condition indicated in metadata comprised by the input image data;
  a shooting angle indicated in metadata comprised by the input image data.

14. A system for generating garment model data representative of a piece of garment, the system comprising a memory and a processor that is configured to:
process input image data retrieved from the memory, the input image data containing a view of the piece of garment;
determine a type of wearing condition from the input image data as at least one of a first type, where the piece of garment is worn by a person, and of a second type, where the piece of garment is not worn;
if the first type is determined,
identify a shape of the piece of garment and a shape of the person wearing the piece of garment in the input image data utilizing an active contour modelling approach based on a preset body model;
adapt the identified shapes of the piece of garment and the identified shape of the person, based on a garment template model retrieved from a garment template model database; and
determine the garment model data from the input image data based on the adapted identified shapes; and
if the second type is determined,
identify a shape of the piece of garment in the input image data;
iteratively compare the input image data with at least one respective garment template model retrieved from the garment template model database to identify a matching garment template model;
align the identified shape with a shape of the at least one matching garment template model; and
determine the garment model data from the input image data based on the identified shape and on results of the aligning.

15. A non-transitory computer program product comprising a program code that, upon execution by a processor, is configured to perform a method of generating garment model data representative of a piece of garment, comprising:
processing, using a processor, input image data retrieved from a storage location in a memory, the input image data containing a view of the piece of garment;
determining, using the processor, a type of wearing condition from the input image data as at least one of a first type, where the piece of garment is worn by a person, and of a second type, where the piece of garment is not worn;
if the first type is determined,
identifying, using the processor, a shape of the piece of garment and a shape of the person wearing the piece of garment in the input image data utilizing an active contour modelling approach based on a preset body model;
adapting, using the processor, the identified shape of the piece of garment and the identified shape of the person, of the piece of garment and the identified shape of the person, based on a garment template model retrieved from a garment template model database stored in the memory; and
determining, using the processor, the garment model data from the input image data based on the adapted identified shapes; and
if the second type is determined,
identifying, using the processor, a shape of the piece of garment in the input image data;
iteratively comparing the input image data with a respective garment template model retrieved from the garment template model database to identify at least one matching garment template model;
aligning, using the processor, the identified shape with a shape of the at least one matching garment template model; and
determining, using the processor, the garment model data from the input image data based on the identified shape and on results of the aligning.

16. The method according to claim 1, wherein the active contour modelling approach is initialized with a face detector and the preset body model, which in particular is a statistical body model.

17. The method according to claim 1, wherein the input image data originate from one of the following:
picked from a website through a browser;
picked from a website via a computer application;
picked from a website via a smartphone application;
a photograph taken by a user;
scans or screenshots of media like catalogues, magazines or screens.

18. The system according to claim 14, wherein the active contour modelling approach is initialized with a face detector and the preset body model, which in particular is a statistical body model.

* * * * *